US011259300B2

(12) United States Patent
Subramanian et al.

(10) Patent No.: US 11,259,300 B2
(45) Date of Patent: *Feb. 22, 2022

(54) TIME-DIVISION MULTIPLEXING TRANSMISSION TIME INTERVALS WITHIN A SUBFRAME OR SLOT FOR MMW SCHEDULING

(71) Applicant: QUALCOMM Incorporated, San Diego, CA (US)

(72) Inventors: Sundar Subramanian, San Diego, CA (US); Joseph Binamira Soriaga, San Diego, CA (US); Ashwin Sampath, Skillman, NJ (US); Junyi Li, Chester, NJ (US); Juergen Cezanne, Ocean Township, NJ (US); Tingfang Ji, San Diego, CA (US); Alexei Yurievitch Gorokhov, San Diego, CA (US); Muhammad Nazmul Islam, Littleton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/858,022

(22) Filed: Apr. 24, 2020

(65) Prior Publication Data

US 2020/0260443 A1 Aug. 13, 2020

Related U.S. Application Data

(63) Continuation of application No. 15/361,878, filed on Nov. 28, 2016, now Pat. No. 10,728,893.

(Continued)

(51) Int. Cl.
*H04W 72/04* (2009.01)
*H04L 5/00* (2006.01)

(52) U.S. Cl.
CPC ....... *H04W 72/0446* (2013.01); *H04L 5/0044* (2013.01); *H04L 5/0053* (2013.01); *H04W 72/042* (2013.01); *H04W 72/0413* (2013.01)

(58) Field of Classification Search
None
See application file for complete search history.

(56) References Cited

U.S. PATENT DOCUMENTS

| 2013/0286960 A1 | 10/2013 | Li et al. | |
| 2014/0204899 A1* | 7/2014 | Tsai | H04L 5/0007 370/330 |

(Continued)

FOREIGN PATENT DOCUMENTS

CN 105075166 A 11/2015

OTHER PUBLICATIONS

Taiwan Search Report—TW106107225—TIPO—dated Dec. 15, 2020.

(Continued)

*Primary Examiner* — Faruk Hamza
*Assistant Examiner* — Cassandra L Decker
(74) *Attorney, Agent, or Firm* — Qualcomm Incorporated

(57) ABSTRACT

A structure where there are self-contained subframes/slots with smaller TTIs within the subframes/slots is provided to address the issues in MMW scheduling. In an aspect of the disclosure, a method, a computer-readable medium, and an apparatus are provided. The apparatus may transmit downlink information to at least one UE using a plurality of downlink TTIs within a subframe/slot. The apparatus may receive uplink information from the at least one UE using at least one uplink region within the subframe/slot. In another aspect of the disclosure, a method, a computer-readable medium, and an apparatus are provided. The apparatus may receive downlink information from a base station using at (Continued)

least one downlink TTI within a subframe/slot. The subframe/slot may include a plurality of downlink TTIs and at least one uplink region. The apparatus may transmit uplink information to the base station using the at least one uplink region within the subframe/slot.

40 Claims, 14 Drawing Sheets

Related U.S. Application Data

(60) Provisional application No. 62/318,191, filed on Apr. 4, 2016.

(56) References Cited

U.S. PATENT DOCUMENTS

| | | | |
|---|---|---|---|
| 2014/0314036 | A1 | 10/2014 | Takeda et al. |
| 2014/0328260 | A1 | 11/2014 | Papasakellariou et al. |
| 2015/0103733 | A1 | 4/2015 | Ahmadi |
| 2015/0333898 | A1 | 11/2015 | Ji et al. |
| 2015/0351132 | A1 | 12/2015 | Park et al. |
| 2015/0358964 | A1 | 12/2015 | Tiirola et al. |
| 2015/0365927 | A1 | 12/2015 | Stanwood et al. |
| 2016/0095137 | A1 | 3/2016 | Chen et al. |
| 2016/0100395 | A1 | 4/2016 | Xu et al. |
| 2016/0192354 | A1 | 6/2016 | Wei et al. |
| 2017/0290002 | A1 | 10/2017 | Subramanian et al. |
| 2018/0049165 | A1 | 2/2018 | Byun et al. |
| 2018/0213530 | A1* | 7/2018 | Mochizuki ........ H04W 72/0446 |
| 2018/0331815 | A1* | 11/2018 | Lee ........................ H04L 5/0048 |
| 2018/0359122 | A1 | 12/2018 | Lee et al. |
| 2018/0359751 | A1* | 12/2018 | Ko .................... H04W 72/0446 |
| 2019/0037640 | A1* | 1/2019 | Xiong ........................ H04L 5/14 |
| 2019/0081841 | A1* | 3/2019 | Kim ........................ H04L 27/26 |
| 2020/0260527 | A1* | 8/2020 | Xiong .................. H04L 5/0073 |

OTHER PUBLICATIONS

Catt: "Design of sPUCCH for shortened TTTI", 3GPP TSG RAN WG1 Meeting #84bis, 3GPP Draft; R1-162298 Design of SPUCCH for Shortened TTI Final, 3rd Generation Partnership Project (3GPP), Mobile Competence Centre; 650, Route Des Lucioles; F-06921 Sophia-Antipolis Cedex; France, vol. RAN WG1, No. Susan, Korea; Apr. 11, 2016-Apr. 15, 2016, Apr. 2, 2016 (Apr. 2, 2016), 3 Pages, XP051080103, Retrieved from the Internet: URL: http://www.3gpp.org/ftp/tsg_ran/WG1_RL1/TSGR1_84b/Docs/ [retrieved on Apr. 2, 2016] Section 2.
CMCC: "Discussion on TTI Shortening for Latency Reduction", 3GPP TSG RAN WG1 Meeting #84, 3GPP Draft; R1-160499, 3rd Generation Partnership Project (3GPP), Mobile Competence Centre; 650, Route Des Lucioles; F-06921 Sophia-Antipolis Cedex; France, vol. RAN WG1, No. St Julian's, Malta; Feb. 15, 2016-Feb. 19, 2016, Feb. 5, 2016 (Feb. 5, 2016), 3 Pages, XP051063821, Retrieved from the Internet: URL: http://www.3gpp.org/ftp/tsg ran/WG1_RL1/TSGR1_84/Docs/ [retrieved on Feb. 5, 2016] Section 3.1.
Dutta S., et al., "Frame Structure Design and Analysis for Millimeter Wave Cellular Systems", IEEE, arXiv: 1512.05691, Dec. 17, 2015, pp. 1-13.
Ericsson: "Downlink Control Signaling Design for Short TTI", 3GPP TSG RAN WG1 Meeting #84bis, 3GPP Draft; R1-163322, Downlink Control Signal Design for Short TTI, 3rd Generation Partnership Project (3GPP), Mobile Competence Centre; 650, Route Des Lucioles; F-06921 Sophia-Antipolis Cedex; France, vol. RAN WG1, No. Bus an; Apr. 11, 2016-Apr. 15, 2016, Apr. 1, 2016 (Apr. 1, 2016), pp. 1-4, XP051079812, Retrieved from the Internet: URL: http://www.3gpp.org/ftp/tsg_ran/WG1_RL1/TSGR1_84b/Docs/ [retrieved on Apr. 1, 2016].
Huawei, et al., "Short TTI for DL Transmissions", 3GPP TSG RAN WG1 Meeting #84, 3GPP Draft; R1-160292, 3rd Generation Partnership Project (3GPP), Mobile Competence Centre; 650, Route Des Lucioles; F-06921 Sophia-Antipolis Cedex; France, vol. RAN WG1, No. St Julian's, Malta; Feb. 15, 2016-Feb. 19, 2016, Feb. 6, 2016 (Feb. 6, 2016), 7 Pages, XP051064110, Retrieved from the Internet: URL: URL:http://www.3gpp.org/ftp/tsg_ran/WG1_RL1/TSGR1_84/Docs/R1-160292.zip [retrieved on Feb. 6, 2016].
International Preliminary Report on Patentability—PCT/US2017/021000, The International Bureau of WIPO—Geneva, Switzerland, dated Oct. 18, 2018.
International Search Report and Written Opinion—PCT/US2017/021000—ISA/EPO—dated Jul. 18, 2017.
Lenovo: "Consideration on TTI Shortening for DL", 3GPP TSG RAN WG1 Meeting #84, 3GPP Draft, R1-161017, 3rd Generation Partnership Project (3GPP), Mobile Competence Centre, 650, Route Des Lucioles, F-06921 Sophia-Antipolis Cedex, France, vol. RAN WG1, No. St Julian's, Malta; Feb. 15, 2016-Feb. 19, 2016, Feb. 14, 2016 (Feb. 14, 2016), 4 Pages, XP051054321, Retrieved from the Internet: URL: http://www.3gpp.org/ftp/Meetings_3GPP_SYNC/RAN1/Docs/ [retrieved on Feb. 14, 2016].
NEC: "Discussion on TTI Shortening for DL/UL Transmissions", 3GPP Draft; R1-162446 DL-UL Short TTI-84BIS-V2D, 3rd Generation Partnership Project (3GPP), Mobile Competence Centre; 650, Route Des Lucioles; F-06921 Sophia-Antipolis Cedex; France, vol. RAN WG1, No. Susan, Korea; Apr. 11, 2016-Apr. 15, 2016, Apr. 1, 2016 (Apr. 1, 2016), 4 Pages, XP051079592, Retrieved from the Internet: URL: http://www.3gpp.org/ftp/tsg_ran/WG1_RL1/TSGR1_84b/Docs/ [retrieved on Apr. 1, 2016] Section 2.
Partial International Search Report—PCT/US2017/021000—ISA/EPO—dated May 18, 2017.
Qualcomm Incorporated: "DL Channel Design for Shortened TTI", 3GPP TSG RAN WG1 #84bis, 3GPP Draft; R1-163068 DL Channel Design for Shortened TTI, 3rd Generation Partnership Project (3GPP), Mobile Competence Centre; 650, Route Des Lucioles; F-06921 Sophia-Antipolis Cedex; France, vol. RAN WG1, No. Busan, Korea; Apr. 11, 2016-Apr. 15, 2016, Apr. 2, 2016 (Apr. 2, 2016), pp. 1-7, XP051080512, Retrieved from the Internet: URL: http://www.3gpp.org/ftp/tsg_ran/WG1_RL1/TSGR1_84b/Docs/ [retrieved on Apr. 2, 2016].

* cited by examiner

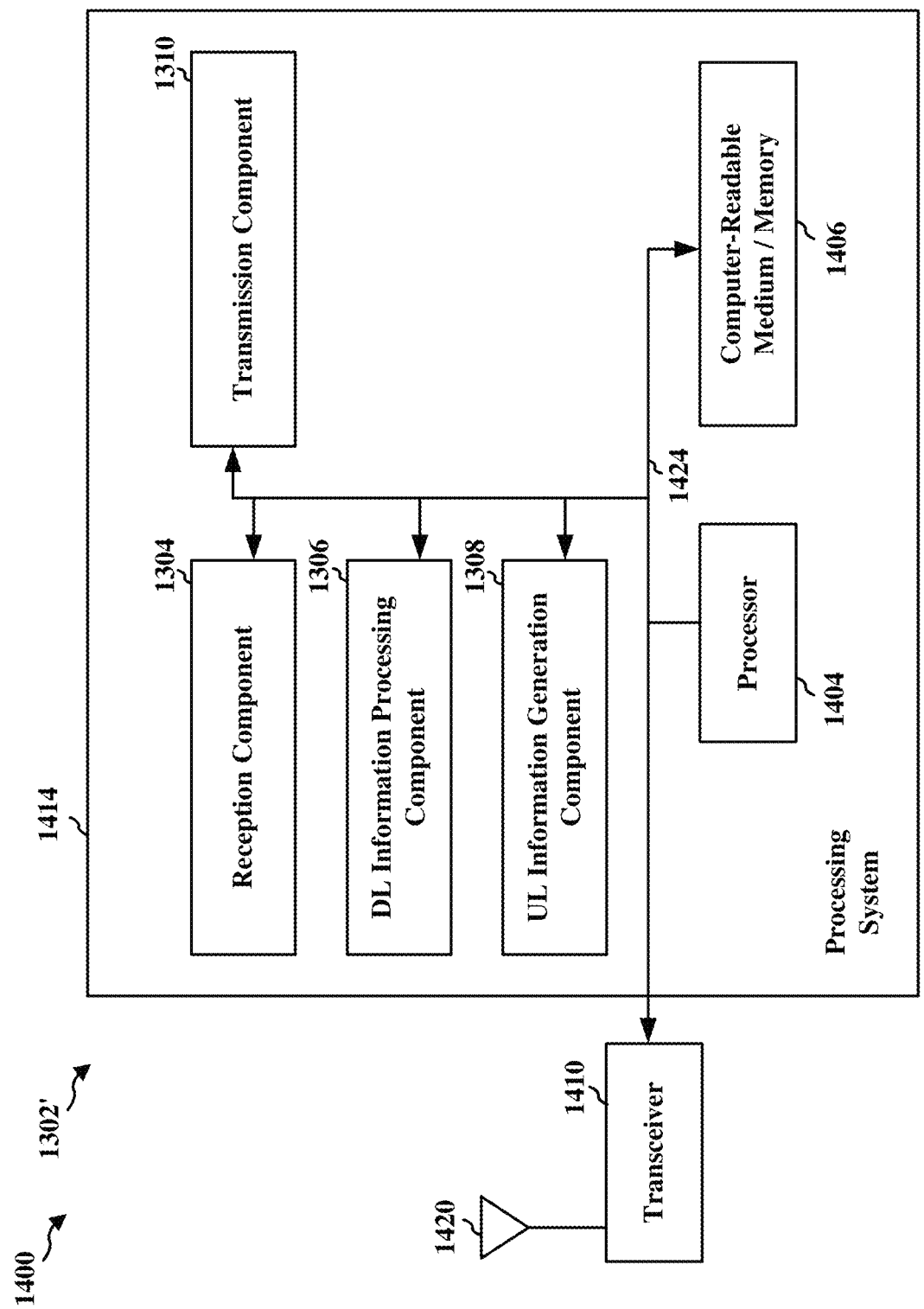

TIME-DIVISION MULTIPLEXING TRANSMISSION TIME INTERVALS WITHIN A SUBFRAME OR SLOT FOR MMW SCHEDULING

CROSS-REFERENCE TO RELATED APPLICATION(S)

The present application is a continuation of U.S. application Ser. No. 15/361,878 entitled "TIME-DIVISION MULTIPLEXING TRANSMISSION TIME INTERVALS WITHIN A SUBFRAME OR SLOT FOR MMW SCHEDULING," filed Nov. 28, 2016, which claims priority to U.S. Provisional Patent Application No. 62/318,191 entitled "TIME-DIVISION MULTIPLEXING TRANSMISSION TIME INTERVALS WITHIN A SUBFRAME OR SLOT FOR MMW SCHEDULING," filed Apr. 4, 2016, assigned to the assignee hereof.

BACKGROUND

Field

The present disclosure relates generally to communication systems, and more particularly, to millimeter wave (MMW) scheduling.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

In MMW systems, the number of digital chains may be limited. Beamforming may be achieved through analog or radio frequency (RF) beamforming. That is, the beam may be created per digital chain, and not in a UE specific manner. Thus, it may be difficult for an evolved Node B (eNB) to simultaneously schedule a large number of UEs through frequency-division multiplexing (FDM) unless the UEs all share the same beam. Further, with the huge bandwidths in MMW systems, allocating large subframes may be inefficient for scheduling and resource utilization. It may be possible to have short subframes that are self-contained, but the overhead of the turnaround, i.e., transmit (TX)—receive (RX), may be significant for small subframes.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In MMW systems, it may be difficult for an eNB to simultaneously schedule a large number of UEs through FDM. Further, with the huge bandwidths in MMW systems, allocating large subframes or slots may be inefficient for scheduling and resource utilization. It may be possible to have short subframes or slots that are self-contained, but the overhead of the turnaround (TX–RX) may be significant for small subframes/slots. In this disclosure, a structure where there are self-contained subframes or slots with smaller transmission time intervals (TTIs) within the subframes or slots is provided to address the issues described above in MMW scheduling.

In an aspect of the disclosure, a method, a computer-readable medium, and an apparatus are provided. The apparatus may transmit downlink information to at least one UE using a plurality of downlink TTIs within a subframe/slot. The apparatus may receive uplink information from the at least one UE using at least one uplink region within the subframe/slot.

In another aspect of the disclosure, a method, a computer-readable medium, and an apparatus are provided. The apparatus may receive downlink information from a base station using at least one downlink TTI within a subframe/slot. The subframe/slot may include a plurality of downlink TTIs and at least one uplink region. The apparatus may transmit uplink information to the base station using the at least one uplink region within the subframe/slot.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 14 is a diagram illustrating an example of a hardware implementation for an apparatus employing a processing system.

DETAILED DESCRIPTION

Figure 1:
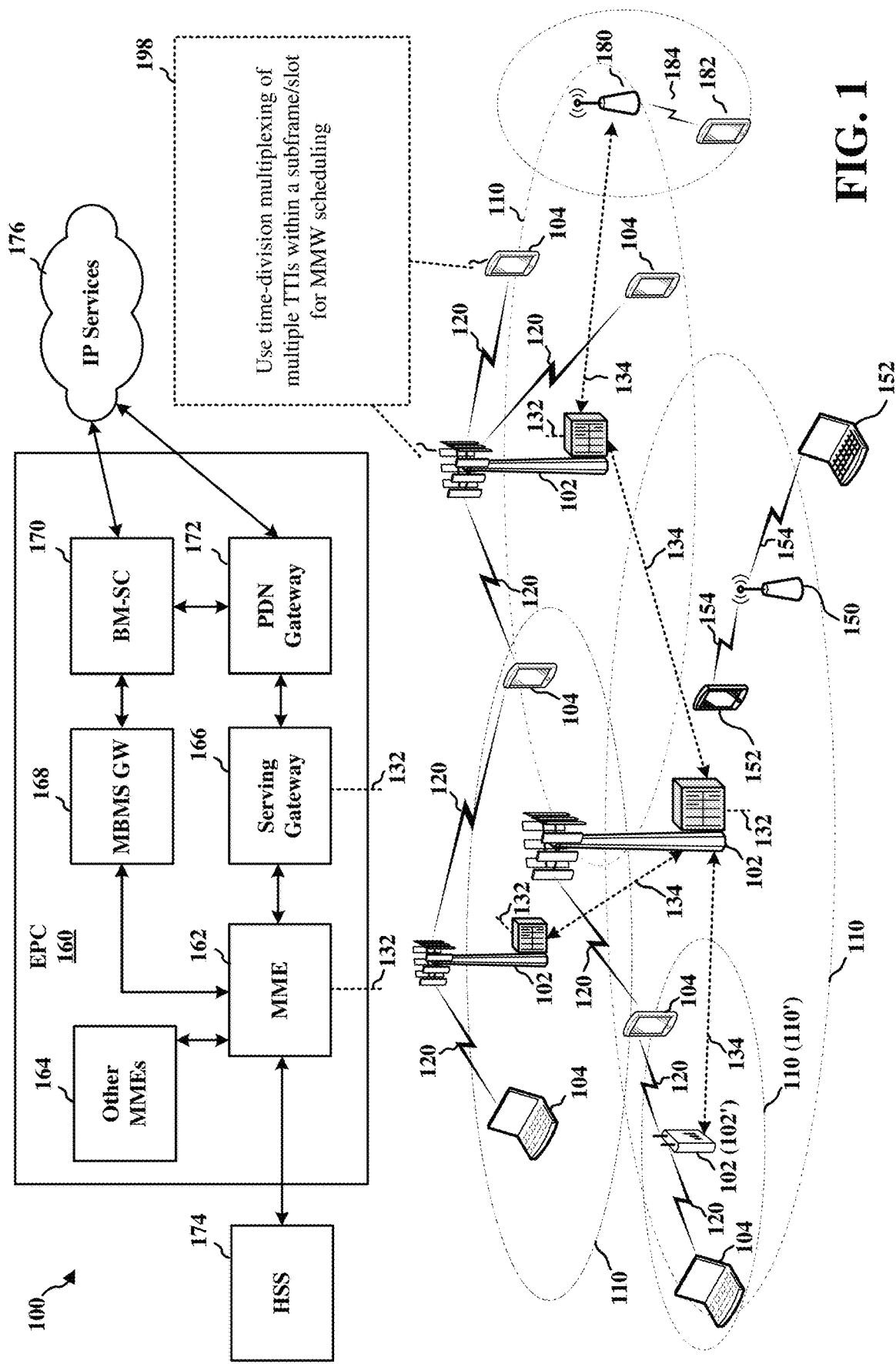
FIG. 1 is a diagram illustrating an example of a wireless communications system and an access network.
Figure 2:
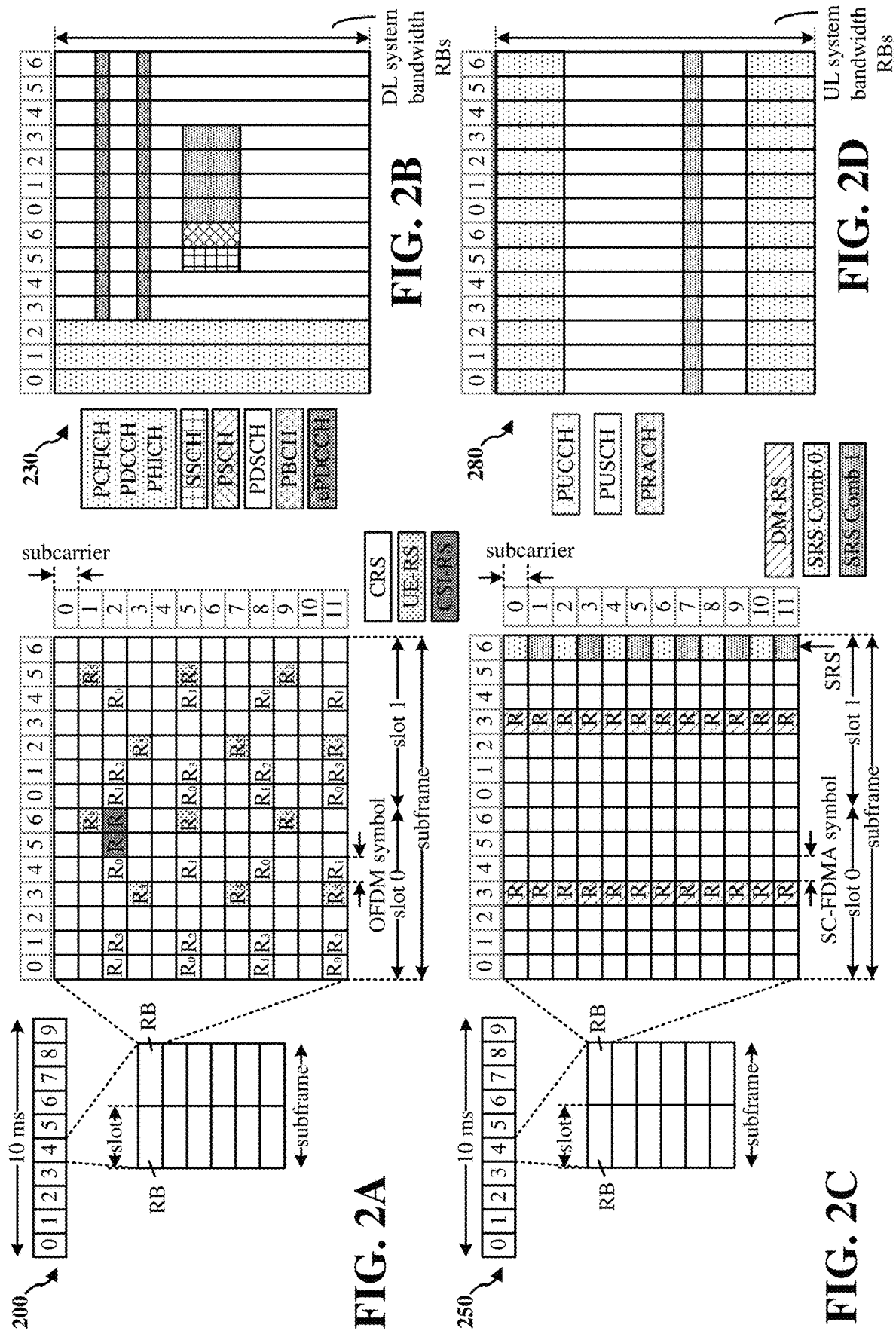
FIGS. 2A, 2B, 2C, and 2D are diagrams illustrating LTE examples of a DL frame structure, DL channels within the DL frame structure, an UL frame structure, and UL channels within the UL frame structure, respectively.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., 51 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104/eNB 102 may be configured to use (198) time-division multiplexing (TDM) of multiple TTIs within a subframe/slot for MMW scheduling. Details of the operations performed at 198 are described below with reference to FIGS. 2-14.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
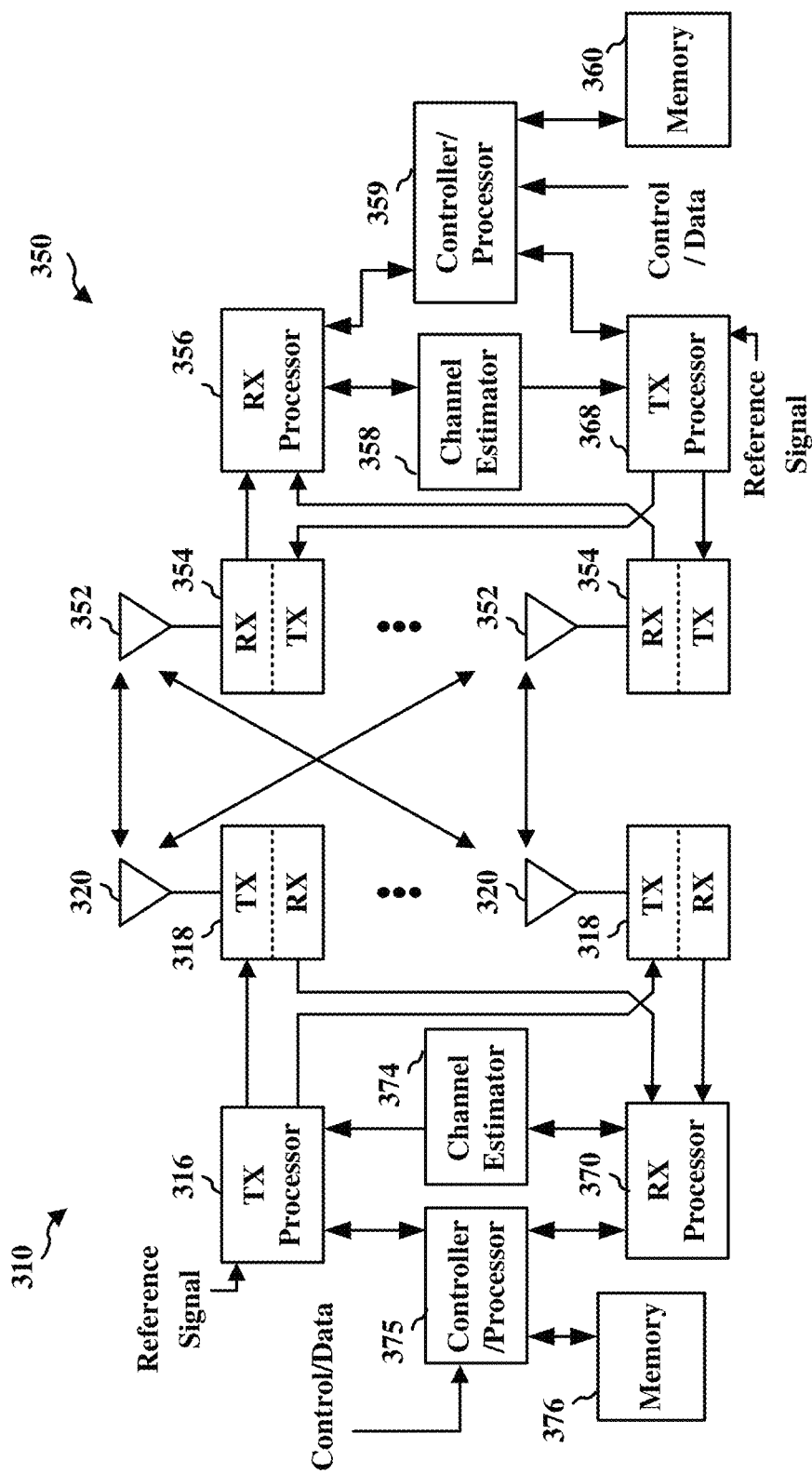
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

A transmission time interval (TTI) refers to the duration of a transmission on the radio link. TTI may be the smallest unit of time in which eNB is capable of scheduling any UE for uplink or downlink transmission. An eNB may inform a UE during each TTI to look for its downlink data in specific RB. The TTI may be related to the size of the data blocks passed from the higher network layers to the radio link layer. To combat errors due to fading and interference on the radio link, data may be divided at the transmitter into blocks and then the bits within a block are encoded and interleaved. The length of time that may be required to transmit one such block may determine the TTI. At the receiver, all bits from a given block may need to be received before they can be deinterleaved and decoded. Having decoded the bits, the receiver can estimate the bit error rate (BER). The shortest decodable transmission may be one TTI. And the shortest period over which BER can be estimated may also be one TTI. A TTI may include a set of OFDM symbols. The number of symbols in a TTI may be referred to as N_TTI, which may be (4, 8, 16, 32, 64) or complement. The TTI duration may be scalable.

Figure 4:
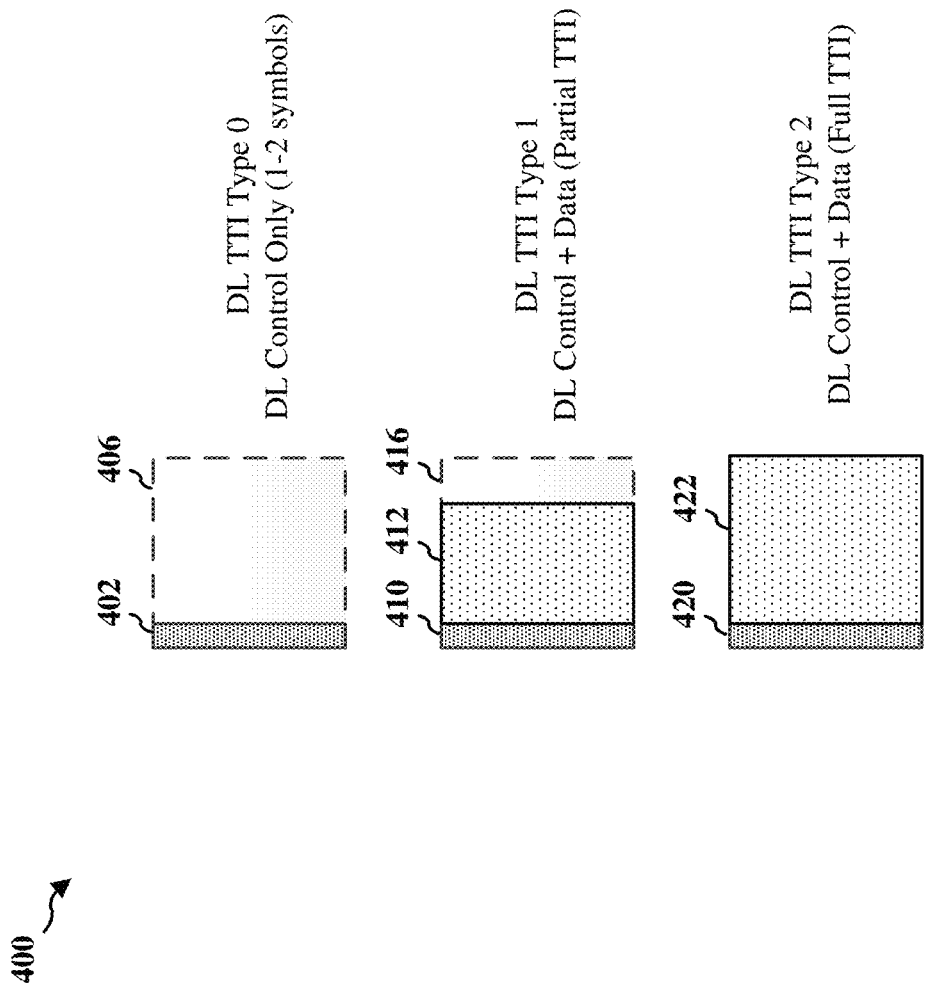
FIG. 4 is a diagram illustrating three types of downlink TTI.

FIG. 4 is a diagram 400 illustrating three types of downlink TTI. A downlink TTI could be defined as a union of a DL control block and a DL data block. The number of symbols in the DL control block (N_DLCtrl) may be less than or equal to 2 (e.g., 1 or 2 symbols). The number of symbols in the DL data block (N_DLData) may be less than or equal to the difference between the number of symbols in the TTI and the number of symbols in the DL control block (N_DLData<=N_TTI-N_DLCtrl).

The three types of DL TTI may be determined based on the number of symbols in the DL data block (N_DLData). As illustrated in FIG. 4, DL TTI type 0 includes a DL control block 402 and does not include any DL data block. The rest (406) of the TTI is not used by the DL TTI. The DL control block 402 may include 1 to 2 symbols. DL TTI type 1 includes a DL control block 410 and a DL data block 412. The rest (416) of the TTI is not used by the DL TTI. DL TTI type 2 occupies the entire TTI and includes a DL control block 420 and a DL data block 422.

In one configuration, DCI may be allowed in the DL data block of the DL TTI. But DCI transmitted in the DL data block of the DL TTI may be less reliable. In one configuration, the DL control block may carry CSI-RS. In one configuration, DL control split symbol may be used for multi-user scheduling.

Figure 5:
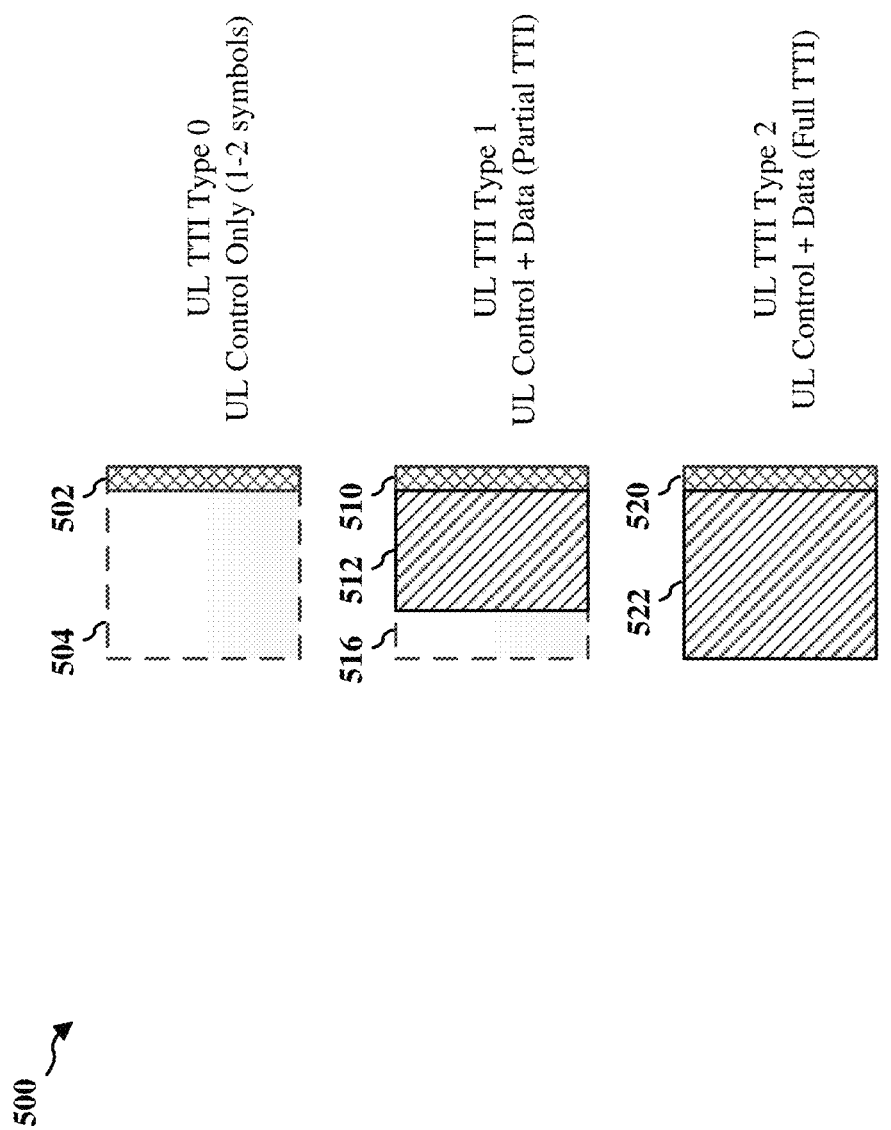
FIG. 5 is a diagram illustrating three types of uplink TTI.

FIG. 5 is a diagram 500 illustrating three types of uplink TTI. A uplink TTI could be defined as a union of a UL control block and a UL data block. The number of symbols in the UL control block (N_ULCtrl) may be 1 or 2. The number of symbols in a UL data block (N_ULData) may be less than or equal to the difference between the number of symbols in the TTI and the number of symbols in the UL control block (N_ULData<=N_TTI-N_ULCtrl).

The three types of UL TTI may be determined based on the number of symbols in the UL data block (N_ULData). As illustrated in FIG. 5, UL TTI type 0 includes a UL control block 502 and does not include any UL data block. The rest (504) of the TTI is not used by the UL TTI. The UL control block 502 may include 1 to 2 symbols. UL TTI type 1 includes a UL control block 510 and a UL data block 512. The rest (516) of the TTI is not used by the UL TTI. UL TTI type 2 occupies the entire TTI and includes a UL control block 520 and a UL data block 522.

In one configuration, UCI may be allowed in the UL data block of the UL TTI. But UCI transmitted in the UL data block of the UL TTI may be less reliable. In one configuration, the UL control block may carry low latency data. In one configuration, UL control split symbol may be used to acknowledge multiple UEs.

Figure 6:
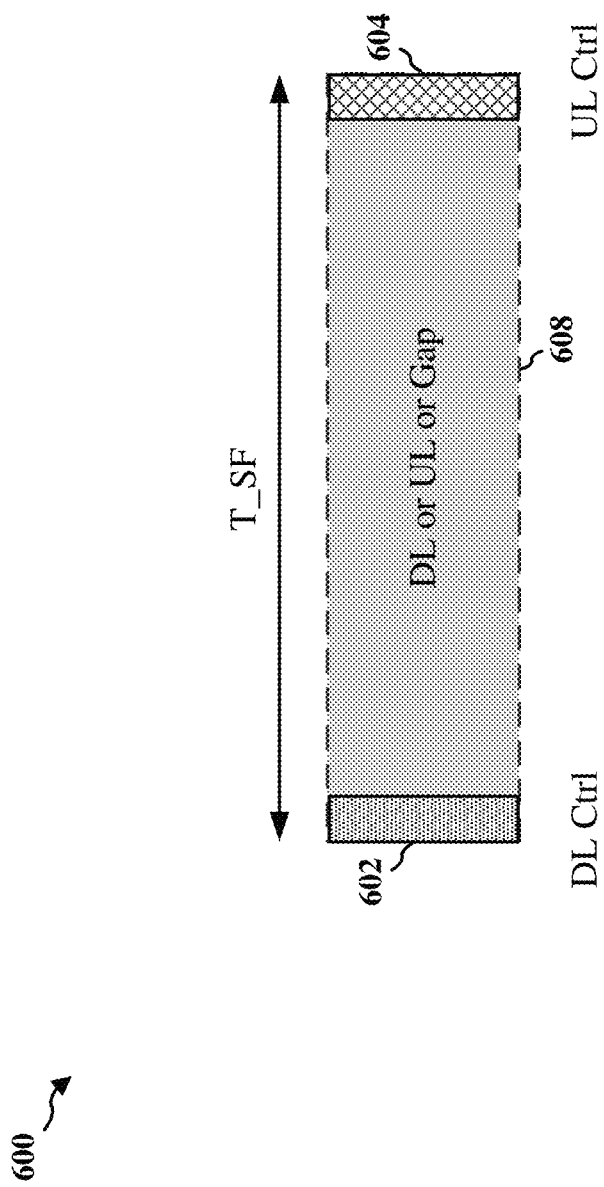
FIG. 6 is a diagram illustrating a subframe/slot that include a downlink TTI and an uplink region.

FIG. 6 is a diagram illustrating a subframe/slot 600 that include a downlink TTI and an uplink region. In one configuration, a slot (e.g., 600) may denote a unit of scheduling. In such a configuration, a subframe may denote a unit of measuring time, not a unit of scheduling. In one configuration, a slot may be divided into mini slots. In one configuration, subframe and slot may be used interchangeably to denote a unit of scheduling. In one configuration, a subframe/slot (e.g., 600) denotes a unit of scheduling.

As illustrated, the size of the subframe/slot 600 is T_SF, which may be measured in millisecond (ms). The subframe/slot 600 includes a DL control block 602 and a UL control block 604. The DL control block 602 is part of the DL TTI and the UL control block 604 is part of the uplink region. The segment 608 between the DL control block 602 and the UL control block 604 may include the data block of the DL TTI, the data block of the uplink region, or a gap between the DL TTI and the uplink region.

In MMW systems, there are very large bandwidths and limited number of beams/chains. Therefore, FDM of many users may not be always feasible, and TDM of users may be preferable. However, a self-contained frame for very short TDM subframe/slot may be inefficient because fixed turn-around time or gaps for short TTIs may result in large overhead.

Figure 7:
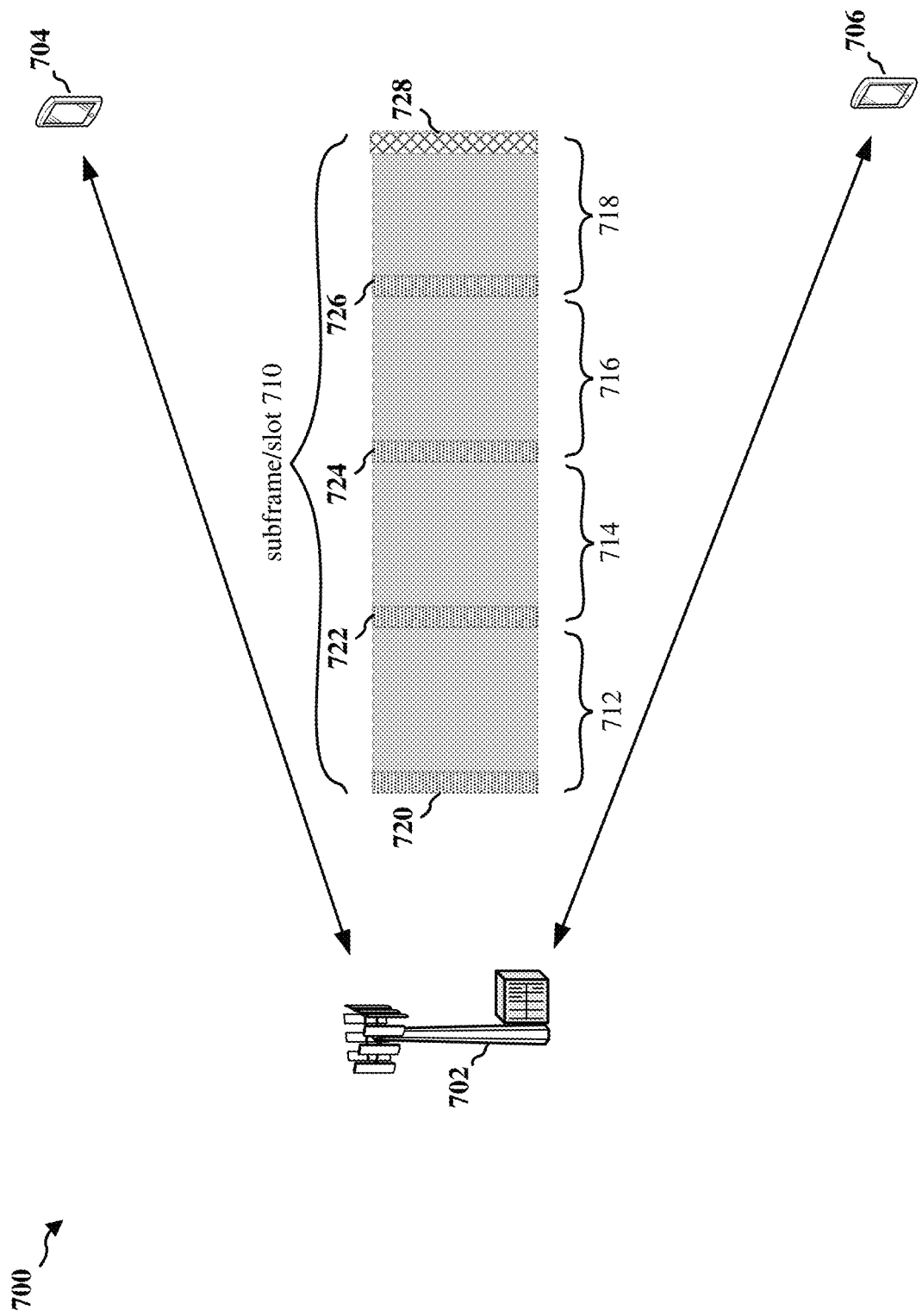
FIG. 7 is a diagram illustrating an example of using a structure of multiple TTIs within a subframe/slot for scheduling in a communication system.

FIG. 7 is a diagram illustrating an example of using a structure of multiple TTIs within a subframe/slot 710 for scheduling in a communication system 700. In one configuration, a slot (e.g., 710) may denote a unit of scheduling. In such a configuration, a subframe may denote a unit of measuring time, not a unit of scheduling. In one configuration, a slot may be divided into mini slots. In one configuration, subframe and slot may be used interchangeably to denote a unit of scheduling. In one configuration, a subframe/slot (e.g., 710) denotes a unit of scheduling.

In one configuration, the communication system 700 may be a MMW system. In this example, the communication system 700 includes an eNB 702 and UEs 704, 706. The eNB 702 may communicate with the UEs 704 and 706 using subframe/slot 710, which includes TTIs 712, 714, 716, and 718. In one configuration, the TTIs 712, 714, 716, and 718 may be equally sized. The subframe/slot 710 may include more than one DL or UL TTIs. For example and in one configuration, the TTI 712 may include a DL TTI with a DL control block 720, the TTI 714 may include a DL TTI with a DL control block 722, the TTI 716 may include a DL TTI with a DL control block 724, and the TTI 718 may include a DL TTI with a DL control block 726 and a uplink region with a UL control block 728.

In one configuration, resources in TTIs 712, 714, 716, and 718 may be assigned for the eNB 702 to communicate with the UEs 704 and 706. For example, resources in TTIs 712 and 714 may be assigned for the eNB 702 to transmit DL information to the UE 704, and resources in TTIs 716 and 718 may be assigned for the eNB 702 to transmit DL information to the UE 706. In one configuration, resources in the uplink region within the TTI 718 may be assigned to the UEs 704 and 706 to transmit UL information to the eNB 702.

In one configuration, the self-contained subframe/slot 710 may use the uplink region within the subframe/slot to acknowledge all the DL TTIs within the subframe/slot. For example, resources in the uplink region within the TTI 718 may be assigned to acknowledge the DL TTIs within the TTIs 712, 714, 716, and 718. In one configuration, the uplink region may acknowledge a subset of the DL TTIs within the subframe/slot 710. For example, resources in the uplink region within the TTI 718 may be assigned to acknowledge the DL TTIs within the TTIs 712 and 714, but no acknowledgment to the DL TTIs within the TTIs 716 and 718. In one configuration, the resources for acknowledgments to the DL TTIs may be implicitly allocated within the uplink region based on a pattern of the DL TTIs. For example, the resources for acknowledging DL TTIs 712, 714, 716, and 718 may be pre-determined based on the fact that the DL TTIs 712, 714, 716, and 718 are within four equally sized TTIs.

In one configuration, the first/earliest DL control block (e.g., 720) in time in a subframe/slot (e.g., 710) may be referred to as a primary DL control that may be synchronized across base stations. The DL control blocks (e.g., 722, 724, and 726) that is subsequent to the primary DL control may be referred to as secondary DL controls. In one configuration, secondary DL control may or may not be present in all subframes/slots. In one configuration, each primary or secondary DL control may specify the resource allocation on the immediately adjoining TTI. For example, the secondary DL control 722 may specify the resource allocation on the DL TTI within the TTI 714. In one configuration, control information that is more protected/important is sent on the primary DL control symbol, and the secondary DL control may contain scheduling information regarding the DL TTI associated with the secondary DL control. In one configuration, the uplink control block 728 may be synchronized across bases stations In one configuration, the DL control (e.g., 720) may indicate the number of combined TTIs (e.g., 4 TTIs of 712, 714, 716, and 718) or size of the TTIs. In one configuration, a UE with higher processing/receiving capability may be scheduled in a DL TTI (e.g., the DL TTI associated with the DL control block 726) that is closer to the uplink region than the DL TTI in which a UE with lower processing/receiving capability is scheduled (e.g., the DL TTI associated with the DL control block 724).

Figure 8:
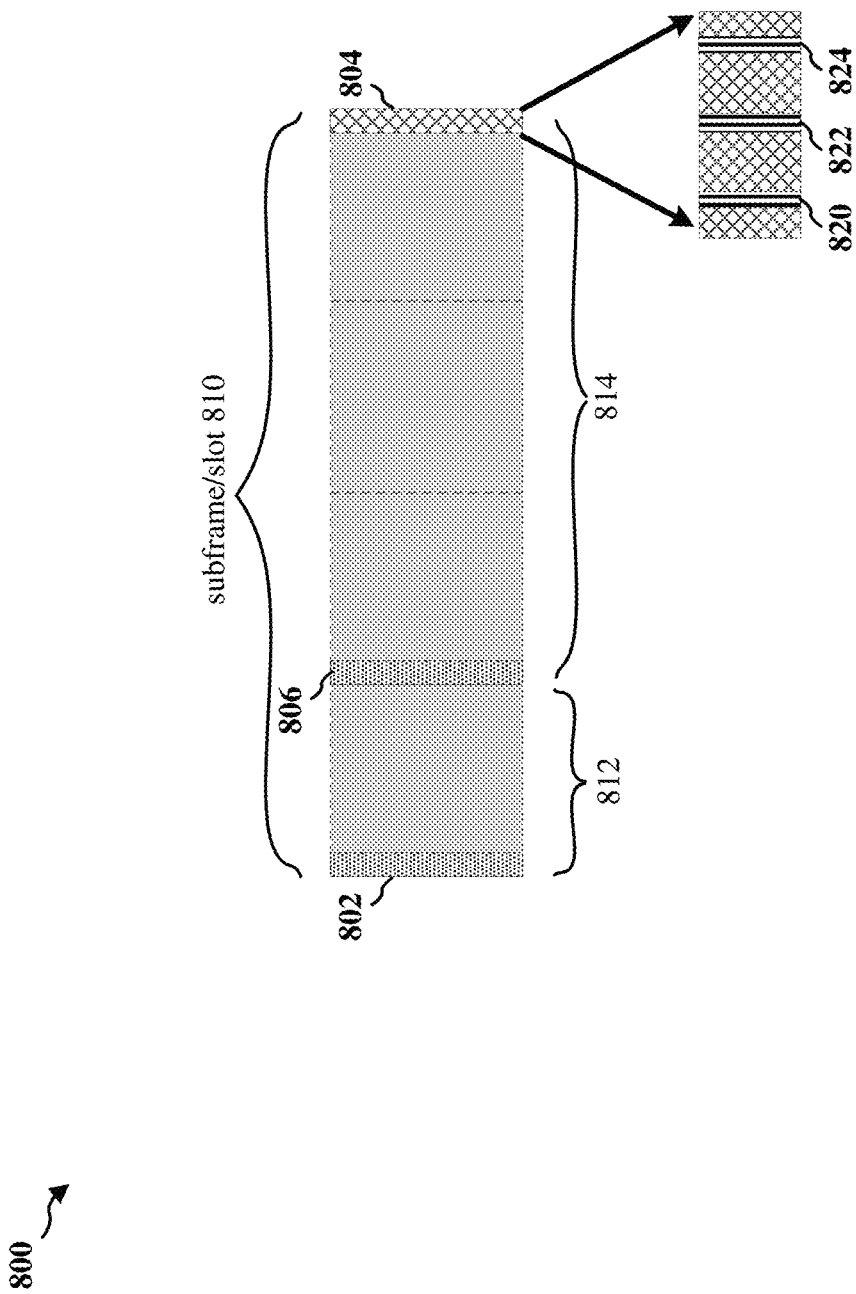
FIG. 8 is a diagram illustrating an example of a structure of multiple TTIs within a subframe/slot for MMW scheduling.

FIG. 8 is a diagram 800 illustrating an example of a structure of multiple TTIs within a subframe/slot 810 for MMW scheduling. In one configuration, the subframe/slot 810 may be used in the MMW system 700 described above with reference to FIG. 7. In this example, the subframe/slot 810 includes TTIs 812 and 814. In one configuration, the TTIs 812 and 814 may be unequally sized. For example, the TTI 814 may be three times of the TTI 812 in duration/length. The subframe/slot 810 may include more than one DL or UL TTIs. For example and in one configuration, the TTI 812 may include a DL TTI with a DL control block 802, the TTI 814 may include a DL TTI with a DL control block 806 and a uplink region with a UL control block 804.

In one configuration, if multiple UEs are scheduled in the subframe/slot 810, the UL control block 804 may be divided into smaller symbols 820, 822, and 824 to address (e.g., acknowledge) different UEs. For example, each of the symbols 820, 822, and 824 may correspond to a UE. In one configuration, the size of each of the symbols 820, 822, 824 may be smaller than a regular symbol (e.g., a symbol in the data block of a DL TTI) in the subframe/slot 810. In one configuration, the number of smaller symbols in the UL control block 804 may be specified in DL control.

In one configuration, the subframe/slot (e.g., 710 or 810) may include two or more UL TTIs. In such a configuration, the primary downlink control (e.g., 720 or 802) may be divided into smaller symbols, each of which may corresponding to an uplink TTI of the two or more uplink TTIs. In one configuration, the size of each of the smaller symbols may be smaller than a regular symbol (e.g., a symbol in the data block of a DL TTI) in the subframe/slot 710 or 810.

Figure 9:
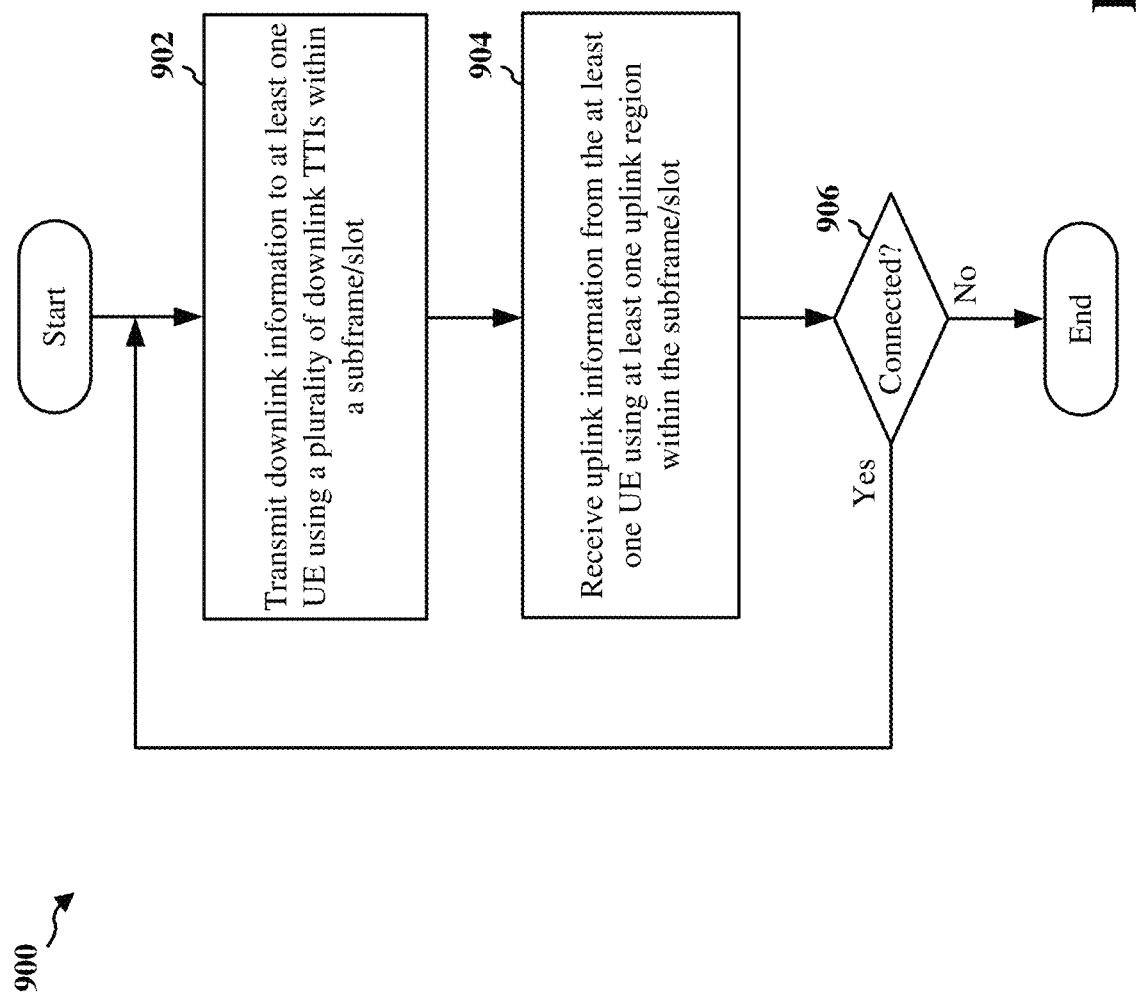
FIG. 9 is a flowchart of a method of wireless communication.

FIG. 9 is a flowchart 900 of a method of wireless communication. The method may be performed by an eNB (e.g., the eNB 102, 310, 702, or the apparatus 1002/1002'). At 902, the eNB may transmit downlink information to at least one UE (e.g., the UEs 704, 706) using a plurality of downlink TTIs within a subframe/slot (e.g., 710 or 810). In one configuration, the subframe/slot (e.g., 710) may include equally sized TTIs. In one configuration, the subframe/slot (e.g., 810) may include unequally sized TTIs. In one configuration, the downlink control block of each downlink TTI may specify resource allocation on the downlink TTI. In one configuration, the downlink control block of a downlink TTI may indicate the number of combined TTIs within the subframe/slot or the size of each combined TTI.

At 904, the eNB may receive uplink information from the at least one UE using at least one uplink region within the subframe/slot. In one configuration, the uplink information may include one or more acknowledgments to at least a subset of the plurality of downlink TTIs. In such a configuration, resources for the one or more acknowledgments may be implicitly allocated within the at least one uplink region based on a pattern of the plurality of downlink TTIs.

In one configuration, the at least one uplink region may include an uplink control block, and each of the plurality of downlink TTIs may include a downlink control block. In one configuration, the uplink control block may include a plurality of symbols, each of which may correspond to a UE scheduled in the subframe/slot. In such a configuration, each of the plurality of symbols in the uplink control block may be smaller than a symbol in the downlink data block of a downlink TTI. In one configuration, the number of the plurality of symbols may be specified in at least one downlink control block of the plurality of downlink TTIs. In one configuration, the number of the plurality of symbols may be specified through higher layer signaling.

In one configuration, the at least one uplink region may include two or more uplink TTIs. In such a configuration, the downlink control block of the subframe/slot may include a plurality of symbols, each of which may correspond to an uplink TTI of the two or more uplink TTIs. Each of the plurality of symbols in the downlink control block of the subframe/slot may be smaller than a symbol in the downlink data block of the subframe/slot.

In one configuration, the downlink control block of the earliest downlink TTI (e.g., 720 or 802) of the plurality of downlink TTIs may be synchronized across bases stations. In one configuration, the uplink control block of the at least one uplink region may be synchronized across bases stations. In one configuration, the downlink control block of the earliest downlink TTI may include control information related to a subsequent downlink TTI of the plurality of downlink TTIs. In one configuration, a downlink TTI corresponding to a first UE may be placed closer to the at least one uplink region than a downlink TTI corresponding to a second UE when the first UE having a higher processing/receiving capability than the second UE.

At 906, the eNB may determine whether it is still connected to the at least one UE. If it the eNB is still connected to the at least one UE, the eNB may loop back to 902 to process the next subframe/slot. If the connection is terminated, the eNB may terminate the method.

Figure 10:
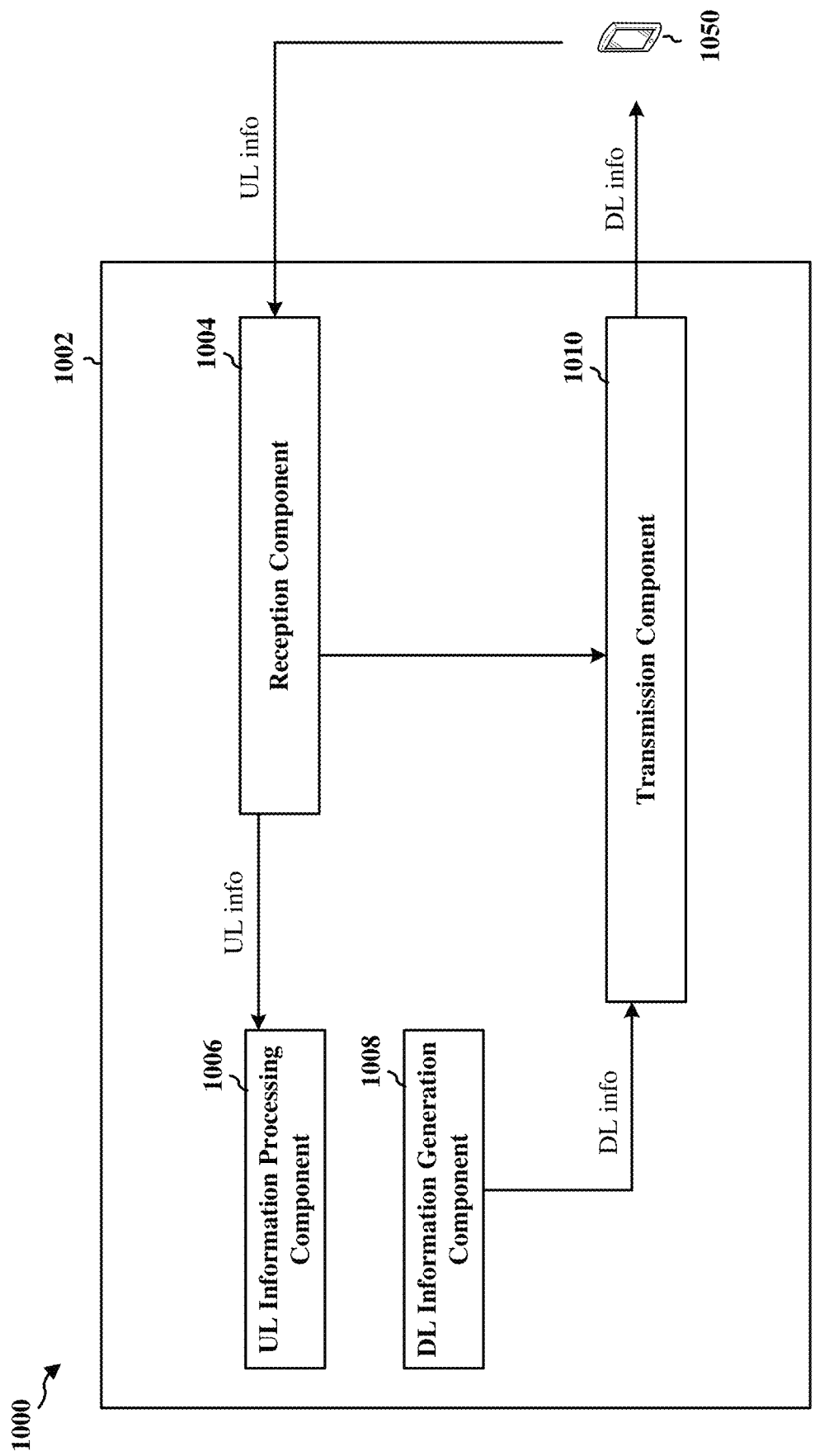
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus 1002 may be an eNB. The apparatus may include a reception component 1004 that receives UL information from a UE 1050 and a UL information processing component 1006 that process the received UL information. In one configuration, the reception component 1004 may perform the operations described above with reference to 904 of FIG. 9. In one configuration, the UL information processing component 1006 may extract UL information from the at least one uplink region within the subframe/slot.

The apparatus 1002 may include a transmission component 1010 that transmits DL information to the UE 1050 and other UEs (not shown). In one configuration, the transmission component 1010 may perform the operations described above with reference to 902 of FIG. 9.

The apparatus 1002 may include a DL information generation component 1008 that generates DL information to be sent to the UE 1050 and other UEs. In one configuration, the DL information generation component 1008 may use resources in the multiple DL TTIs of the subframe/slot to carry DL information.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
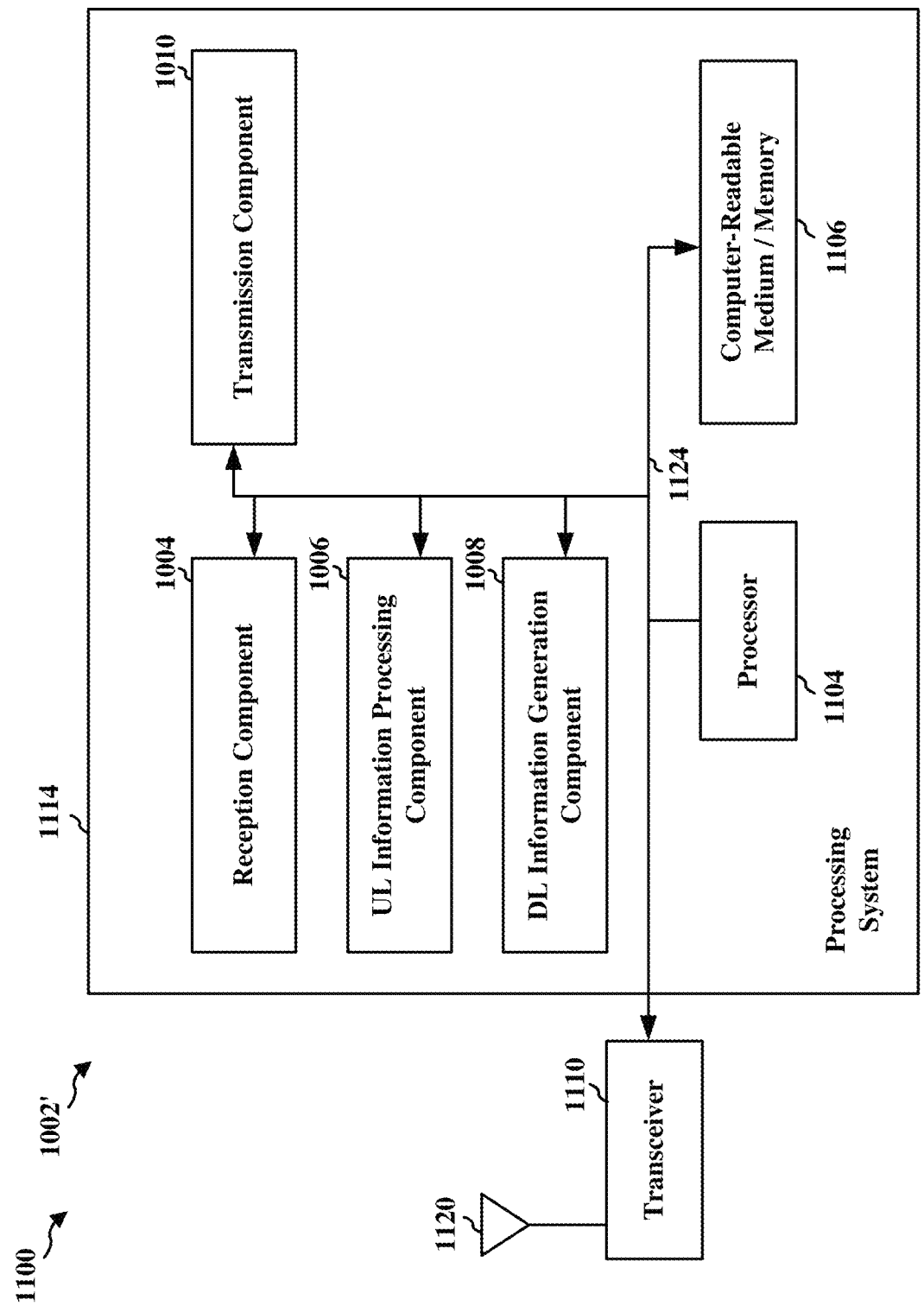
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010. The components may be software components running in the processor 1104, resident/stored in the computer readable medium/memory 1106, one or more hardware components coupled to the processor 1104, or some combination thereof. The processing system 1114 may be a component of the eNB 310 and may include the memory 376 and/or at least one of the TX processor 316, the RX processor 370, and the controller/processor 375.

In one configuration, the apparatus 1002/1002' for wireless communication may include means for transmitting downlink information to at least one UE using a plurality of downlink TTIs within a subframe/slot. In one configuration, the means for transmitting downlink information to at least one UE using a plurality of downlink TTIs within a subframe/slot may perform operations described above with reference to 902 of FIG. 9. In one configuration, the means for transmitting downlink information to at least one UE using a plurality of downlink TTIs within a subframe/slot may be the one or more antennas 1120, the transceiver 1110, the transmission component 1010, or the processor 1104.

In one configuration, the apparatus 1002/1002' may include means for receiving uplink information from the at least one UE using at least one uplink region within the subframe/slot. In one configuration, the means for receiving uplink information from the at least one UE using at least one uplink region within the subframe/slot may perform operations described above with reference to 904 of FIG. 9. In one configuration, the means for receiving uplink information from the at least one UE using at least one uplink region within the subframe/slot may be the one or more antennas 1120, the transceiver 1110, the reception component 1004, or the processor 1104.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 12:
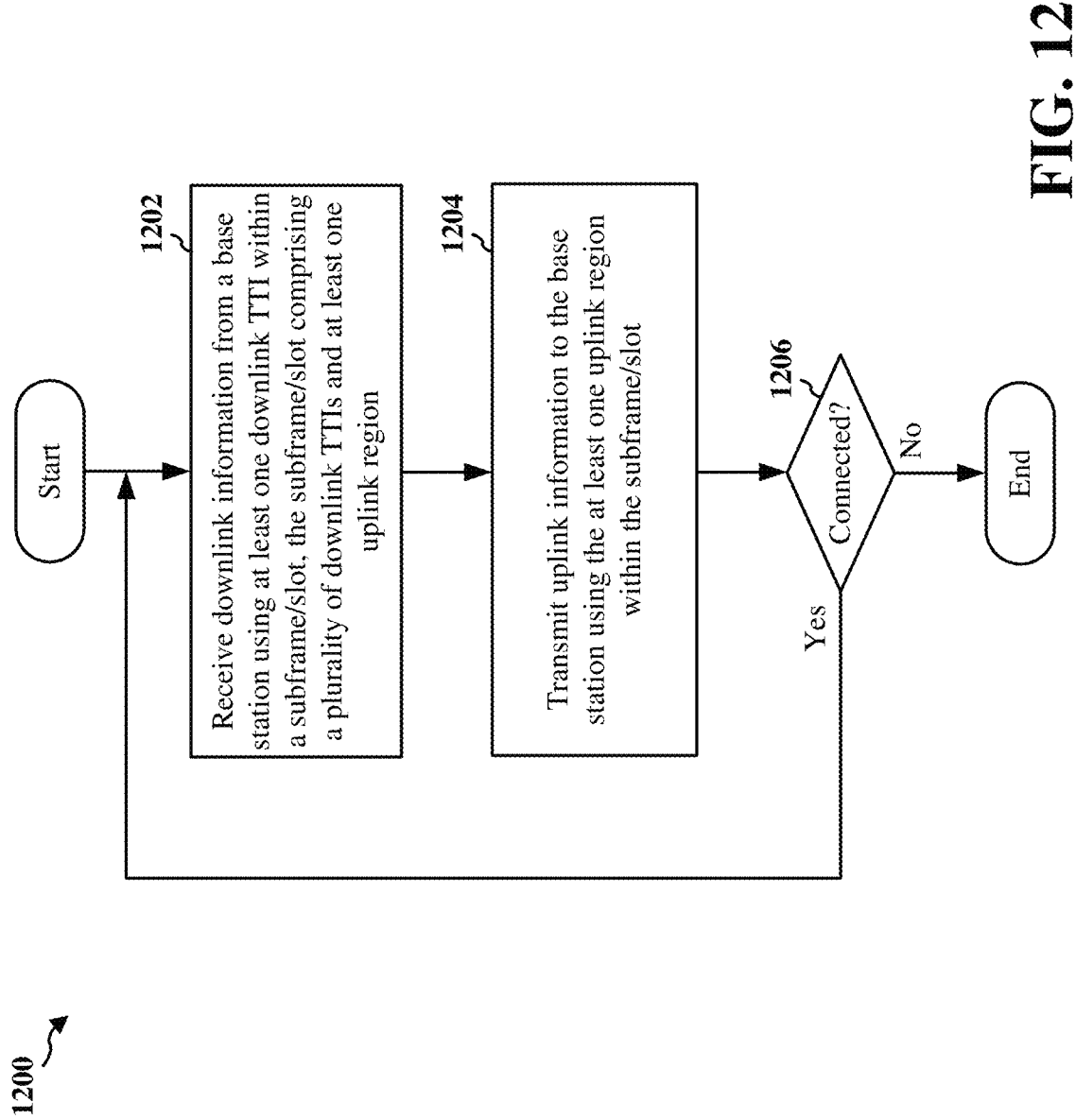
FIG. 12 is a flowchart of a method of wireless communication.

FIG. 12 is a flowchart 1200 of a method of wireless communication. The method may be performed by a UE (e.g., the UE 104, 350, 704, 706, or the apparatus 1302/1302'). At 1202, the UE may receive downlink information from a base station (e.g., 702) using at least one downlink TTI within a subframe/slot (e.g., 710 or 810). The subframe/slot may include a plurality of downlink TTIs and at least one uplink region. In one configuration, the subframe/slot (e.g., 710) may include equally sized TTIs. In one configuration, the subframe/slot (e.g., 810) may include unequally sized TTIs. In one configuration, the downlink control block of each downlink TTI may specify resource allocation on the downlink TTI. In one configuration, the downlink control block of a downlink TTI may indicate the number of combined TTIs within the subframe/slot or a size of each combined TTI.

At 1204, the UE may transmit uplink information to the base station using the at least one uplink region within the subframe/slot. In one configuration, the uplink information may include an acknowledgment to the at least one downlink TTI. In such a configuration, resources for the acknowledgment may be implicitly allocated within the at least one uplink region based on a pattern of the plurality of downlink TTIs.

In one configuration, the at least one uplink region may include an uplink control block, and each of the plurality of downlink TTIs may include a downlink control block. In one configuration, the uplink control block may include a plurality of symbols, each of which may correspond to a UE scheduled in the subframe/slot. In such a configuration, each of the plurality of symbols in the uplink control block may be smaller than a symbol in the downlink data block of a downlink TTI. In one configuration, the number of the plurality of symbols may be specified in at least one downlink control block of the plurality of downlink TTIs. In one configuration, the number of the plurality of symbols may be specified through higher layer signaling.

In one configuration, the at least one uplink region may include two or more uplink TTIs. In such a configuration, the downlink control block of the subframe/slot may include a plurality of symbols, each of which may correspond to an uplink TTI of the two or more uplink TTIs. Each of the plurality of symbols in the downlink control block of the subframe/slot may be smaller than a symbol in the downlink data block of the subframe/slot.

In one configuration, the downlink control block of the earliest downlink TTI (e.g., 720 or 802) of the plurality of downlink TTIs may be synchronized across bases stations. In one configuration, the uplink control block of the at least one uplink region may be synchronized across bases stations. In one configuration, the downlink control block of the earliest downlink TTI may include control information related to a subsequent downlink TTI of the plurality of downlink TTIs. In one configuration, a downlink TTI corresponding to a first UE may be placed closer to the at least one uplink region than a downlink TTI corresponding to a second UE when the first UE having a higher processing/receiving capability than the second UE.

At 1206, the UE may determine whether it is still connected to the base station. If the UE is still connected to the base station, the UE may loop back to 1202 to process the next subframe/slot. If the connection is terminated, the UE may terminate the method.

Figure 13:
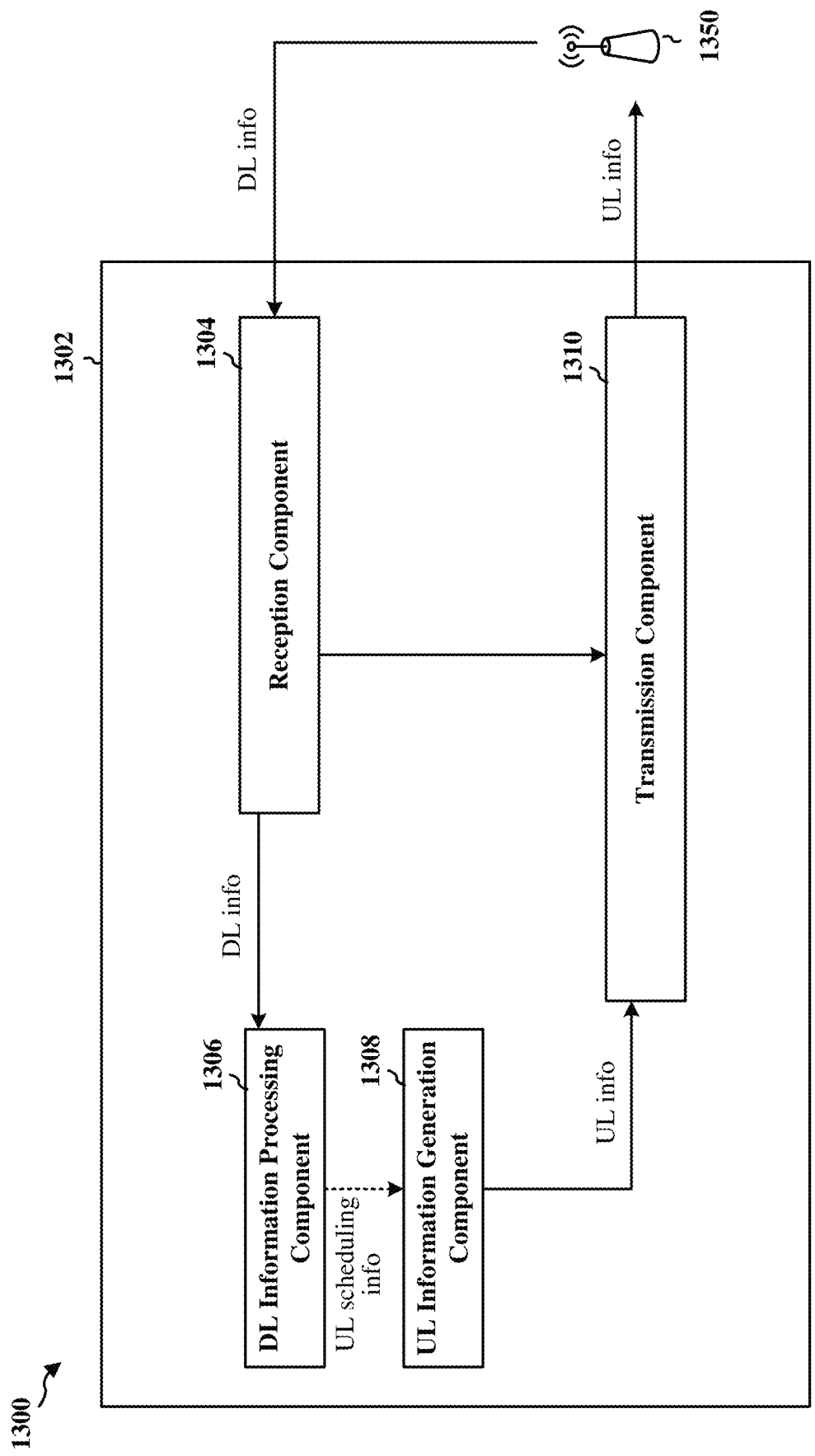
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a UE. The apparatus may include a reception component 1304 that receives DL information from a base station 1350 and a DL information processing component 1306 that process the received DL information. In one configuration, the reception component 1304 may perform the operations described above with reference to 1202 of FIG. 12. In one configuration, the DL information processing component 1306 may extract DL information from one or more DL TTIs within the subframe/slot.

The apparatus 1302 may include a transmission component 1310 that transmits UL information to the base station 1350. In one configuration, the transmission component 1310 may perform the operations described above with reference to 1204 of FIG. 12.

The apparatus 1302 may include a UL information generation component 1308 that generates UL information to be sent to the base station 1350. In one configuration, the UL information generation component 1308 may use resources in the at least one uplink region of the subframe/slot to carry UL information. In one configuration, the UL information generation component 1308 may optionally receive UL scheduling information from the DL information processing component 1306.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310 and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1310, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310. The components may be software components running in the processor 1404, resident/stored in the computer readable medium/memory 1406, one or more hardware components coupled to the processor 1404, or some combination thereof. The processing system 1414 may be a component of the UE 350 and may include the memory 360 and/or at least one of the TX processor 368, the RX processor 356, and the controller/processor 359.

In one configuration, the apparatus 1302/1302' for wireless communication may include means for receiving downlink information from a base station using at least one downlink TTI within a subframe/slot. In one configuration, the means for receiving downlink information from a base station using at least one downlink TTI within a subframe/slot may perform operations described above with reference to 1202 of FIG. 12. In one configuration, the means for receiving downlink information from a base station using at least one downlink TTI within a subframe/slot may be the one or more antennas 1420, the transceiver 1410, the reception component 1304, or the processor 1404.

In one configuration, the apparatus 1302/1302' may include means for transmitting uplink information to the base station using the at least one uplink region within the subframe/slot. In one configuration, the means for transmitting uplink information to the base station using the at least one uplink region within the subframe/slot may perform operations described above with reference to 1204 of FIG. 12. In one configuration, the means for transmitting uplink information to the base station using the at least one uplink region within the subframe/slot may be the one or more antennas 1420, the transceiver 1410, the transmission component 1310, or the processor 1404.

The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   receiving downlink information from a base station using at least one downlink transmission time interval (TTI) within a subframe or slot, the subframe or slot comprising a plurality of downlink TTIs that do not overlap in time with each other and at least one uplink region, each of the plurality of downlink TTIs comprising a downlink control block; and
   transmitting uplink information to the base station using the at least one uplink region within the same subframe or slot, wherein the at least one of the plurality of downlink TTIs within the same subframe or slot comprises a downlink control block and the at least one uplink region within the same subframe or slot comprises an uplink control block, and wherein the subframe or slot further comprises at least one of an uplink data block or a downlink data block, wherein the uplink control block comprises a plurality of symbols, wherein each of the plurality of symbols in the uplink control block is smaller than a symbol in a downlink data block of a downlink TTI.

2. The method of claim 1, wherein the at least one uplink region comprises two or more uplink TTIs.

3. The method of claim 2, wherein the downlink control block of the subframe or slot comprises a plurality of symbols, each of the plurality of symbols corresponding to an uplink TTI of the two or more uplink TTIs, wherein each of the plurality of symbols in the downlink control block of the subframe or slot is smaller than a symbol in a downlink data block of the subframe or slot.

4. The method of claim 1, wherein the downlink control block of an earliest downlink TTI of the plurality of contiguous downlink TTIs is synchronized across base stations, wherein the downlink control block of the earliest downlink TTI comprises control information related to a subsequent downlink TTI of the plurality of contiguous downlink TTIs.

5. The method of claim 1, wherein the uplink control block of the at least one uplink region is synchronized across base stations.

6. The method of claim 1, wherein the respective downlink control block of each downlink TTI specifies resource allocation on the respective downlink TTI.

7. The method of claim 1, wherein the respective downlink control block of a downlink TTI indicates a number of combined TTIs within the subframe or slot or a size of each combined TTI.

8. A method of wireless communication at a user equipment (UE), comprising:
   receiving downlink information from a base station using at least one downlink transmission time interval (TTI) within a subframe or slot, the subframe or slot comprising a plurality of downlink TTIs that do not overlap in time with each other and at least one uplink region, each of the plurality of downlink TTIs comprising a downlink control block; and
   transmitting uplink information to the base station using the at least one uplink region within the same subframe or slot, wherein the at least one of the plurality of downlink TTIs within the same subframe or slot comprises a downlink control block and the at least one uplink region within the same subframe or slot comprises an uplink control block, wherein the subframe or slot further comprises at least one of an uplink data block or a downlink data block, wherein the uplink control block comprises a plurality of symbols, each of the plurality of symbols corresponding to a UE scheduled in the subframe or slot, and wherein each of the plurality of symbols in the uplink control block is smaller than a symbol in a downlink data block of a downlink TTI.

9. The method of claim 8, wherein a number of the plurality of symbols is specified through higher layer signaling.

10. The method of claim 8, wherein a number of the plurality of symbols is specified in at least one downlink control block of the plurality of downlink TTIs.

11. An apparatus for wireless communication at a user equipment (UE), comprising:
    a memory; and
    at least one processor coupled to the memory and configured to:
        receive downlink information from a base station using at least one downlink transmission time interval (TTI) within a subframe or slot, the subframe or slot comprising a plurality of downlink TTIs that do not overlap in time with each other and at least one uplink region, each of the plurality of downlink TTIs comprising a downlink control block; and
        transmit uplink information to the base station using the at least one uplink region within the same subframe or slot, wherein the at least one of the plurality of downlink TTIs within the same subframe or slot comprises a downlink control block and the at least one uplink region within the same subframe or slot comprises an uplink control block, and wherein the subframe or slot further comprises at least one of an uplink data block or a downlink data block, wherein the uplink control block comprises a plurality of symbols, wherein each of the plurality of symbols in the uplink control block is smaller than a symbol in a downlink data block of a downlink TTI.

12. The apparatus of claim 11, wherein the at least one uplink region comprises two or more uplink TTIs.

13. The apparatus of claim 12, wherein the downlink control block of the subframe or slot comprises a plurality of symbols, each of the plurality of symbols corresponding to an uplink TTI of the two or more uplink TTIs, wherein each of the plurality of symbols in the downlink control block of the subframe or slot is smaller than a symbol in a downlink data block of the subframe or slot.

14. The apparatus of claim 11, wherein the downlink control block of an earliest downlink TTI of the plurality of contiguous downlink TTIs is synchronized across base stations, wherein the downlink control block of the earliest downlink TTI comprises control information related to a subsequent downlink TTI of the plurality of contiguous downlink TTIs.

15. The apparatus of claim 11, wherein the uplink control block of the at least one uplink region is synchronized across base stations.

16. The apparatus of claim 11, wherein the respective downlink control block of each downlink TTI specifies resource allocation on the respective downlink TTI.

17. The apparatus of claim 11, wherein the respective downlink control block of a downlink TTI indicates a number of combined TTIs within the subframe or slot or a size of each combined TTI.

18. An apparatus for wireless communication at a user equipment (UE), comprising:
   a memory; and
   at least one processor coupled to the memory and configured to:
      receive downlink information from a base station using at least one downlink transmission time interval (TTI) within a subframe or slot, the subframe or slot comprising a plurality of downlink TTIs that do not overlap in time with each other and at least one uplink region, each of the plurality of downlink TTIs comprising a downlink control block; and
      transmit uplink information to the base station using the at least one uplink region within the same subframe or slot, wherein the at least one of the plurality of downlink TTIs within the same subframe or slot comprises a downlink control block and the at least one uplink region within the same subframe or slot comprises an uplink control block, wherein the subframe or slot further comprises at least one of an uplink data block or a downlink data block, wherein the uplink control block comprises a plurality of symbols, each of the plurality of symbols corresponding to a UE scheduled in the subframe or slot, and wherein each of the plurality of symbols in the uplink control block is smaller than a symbol in a downlink data block of a downlink TTI.

19. The apparatus of claim 18, wherein a number of the plurality of symbols is specified through higher layer signaling.

20. The apparatus of claim 18, wherein a number of the plurality of symbols is specified in at least one downlink control block of the plurality of downlink TTIs.

21. A method of wireless communication at a base station, comprising:
   transmitting downlink information to a user equipment (UE) using at least one downlink transmission time interval (TTI) within a subframe or slot, the subframe or slot comprising a plurality of downlink TTIs that do not overlap in time with each other and at least one uplink region, each of the plurality of downlink TTIs comprising a downlink control block; and
   receiving uplink information from the UE using the at least one uplink region within the same subframe or slot, wherein the at least one of the plurality of downlink TTIs within the same subframe or slot comprises a downlink control block and the at least one uplink region within the same subframe or slot comprises an uplink control block, and wherein the subframe or slot further comprises at least one of an uplink data block or a downlink data block, wherein the uplink control block comprises a plurality of symbols, wherein each of the plurality of symbols in the uplink control block is smaller than a symbol in a downlink data block of a downlink TTI.

22. The method of claim 21, wherein the at least one uplink region comprises two or more uplink TTIs.

23. The method of claim 22, wherein the downlink control block of the subframe or slot comprises a plurality of symbols, each of the plurality of symbols corresponding to an uplink TTI of the two or more uplink TTIs, wherein each of the plurality of symbols in the downlink control block of the subframe or slot is smaller than a symbol in a downlink data block of the subframe or slot.

24. The method of claim 21, wherein the downlink control block of an earliest downlink TTI of the plurality of contiguous downlink TTIs is synchronized across base stations, wherein the downlink control block of the earliest downlink TTI comprises control information related to a subsequent downlink TTI of the plurality of contiguous downlink TTIs.

25. The method of claim 21, wherein the uplink control block of the at least one uplink region is synchronized across base stations.

26. The method of claim 21, wherein the respective downlink control block of each downlink TTI specifies resource allocation on the respective downlink TTI.

27. The method of claim 21, wherein the respective downlink control block of a downlink TTI indicates a number of combined TTIs within the subframe or slot or a size of each combined TTI.

28. A method of wireless communication at a base station, comprising:
   transmitting downlink information to a user equipment (UE) using at least one downlink transmission time interval (TTI) within a subframe or slot, the subframe or slot comprising a plurality of downlink TTIs that do not overlap in time with each other and at least one uplink region, each of the plurality of downlink TTIs comprising a downlink control block; and
   receiving uplink information from the UE using the at least one uplink region within the same subframe or slot, wherein the at least one of the plurality of downlink TTIs within the same subframe or slot comprises a downlink control block and the at least one uplink region within the same subframe or slot comprises an uplink control block, wherein the subframe or slot further comprises at least one of an uplink data block or a downlink data block, wherein the uplink control block comprises a plurality of symbols, each of the plurality of symbols corresponding to a UE scheduled in the subframe or slot, and wherein each of the plurality of symbols in the uplink control block is smaller than a symbol in a downlink data block of a downlink TTI.

29. The method of claim 28, wherein a number of the plurality of symbols is specified through higher layer signaling.

30. The method of claim 28, wherein a number of the plurality of symbols is specified in at least one downlink control block of the plurality of downlink TTIs.

31. An apparatus for wireless communication at a base station, comprising:
   a memory; and
   at least one processor coupled to the memory and configured to:
      transmit downlink information to a user equipment (UE) using at least one downlink transmission time interval (TTI) within a subframe or slot, the subframe or slot comprising a plurality of downlink TTIs that do not overlap in time with each other and at least one uplink region, each of the plurality of downlink TTIs comprising a downlink control block; and
      receive uplink information from the UE using the at least one uplink region within the same subframe or slot, wherein the at least one of the plurality of downlink TTIs within the same subframe or slot comprises a downlink control block and the at least one uplink region within the same subframe or slot comprises an uplink control block, and wherein the subframe or slot further comprises at least one of an uplink data block or a downlink data block, wherein the uplink control block comprises a plurality of symbols, wherein each of the plurality of symbols in the uplink control block is smaller than a symbol in a downlink data block of a downlink TTI.

32. The apparatus of claim 31, wherein the at least one uplink region comprises two or more uplink TTIs.

33. The apparatus of claim 32, wherein the downlink control block of the subframe or slot comprises a plurality of symbols, each of the plurality of symbols corresponding to an uplink TTI of the two or more uplink TTIs, wherein each of the plurality of symbols in the downlink control block of the subframe or slot is smaller than a symbol in a downlink data block of the subframe or slot.

34. The apparatus of claim 31, wherein the downlink control block of an earliest downlink TTI of the plurality of contiguous downlink TTIs is synchronized across base stations, wherein the downlink control block of the earliest downlink TTI comprises control information related to a subsequent downlink TTI of the plurality of contiguous downlink TTIs.

35. The apparatus of claim 31, wherein the uplink control block of the at least one uplink region is synchronized across base stations.

36. The apparatus of claim 31, wherein the respective downlink control block of each downlink TTI specifies resource allocation on the respective downlink TTI.

37. The apparatus of claim 31, wherein the respective downlink control block of a downlink TTI indicates a number of combined TTIs within the subframe or slot or a size of each combined TTI.

38. An apparatus for wireless communication at a base station, comprising:
a memory; and
at least one processor coupled to the memory and configured to:
transmit downlink information to a user equipment (UE) using at least one downlink transmission time interval (TTI) within a subframe or slot, the subframe or slot comprising a plurality of downlink TTIs that do not overlap in time with each other and at least one uplink region, each of the plurality of downlink TTIs comprising a downlink control block; and
receive uplink information from the UE using the at least one uplink region within the same subframe or slot, wherein the at least one of the plurality of downlink TTIs within the same subframe or slot comprises a downlink control block and the at least one uplink region within the same subframe or slot comprises an uplink control block, wherein the subframe or slot further comprises at least one of an uplink data block or a downlink data block, wherein the uplink control block comprises a plurality of symbols, each of the plurality of symbols corresponding to a UE scheduled in the subframe or slot, and wherein each of the plurality of symbols in the uplink control block is smaller than a symbol in a downlink data block of a downlink TTI.

39. The apparatus of claim 38, wherein a number of the plurality of symbols is specified through higher layer signaling.

40. The apparatus of claim 38, wherein a number of the plurality of symbols is specified in at least one downlink control block of the plurality of downlink TTIs.

* * * * *